United States Patent
Kim

[19]

[11] Patent Number: 6,109,048
[45] Date of Patent: Aug. 29, 2000

[54] REFRIGERATOR HAVING A COMPRESSOR WITH VARIABLE COMPRESSION CAPACITY

[75] Inventor: Jung Youb Kim, Suwon, Rep. of Korea

[73] Assignee: SamSung Electronics Co., Ltd., Suwon, Rep. of Korea

[21] Appl. No.: 09/233,497

[22] Filed: Jan. 20, 1999

[51] Int. Cl.[7] .................................................. F25B 1/00
[52] U.S. Cl. ............................ 62/228.4; 62/157; 62/227
[58] Field of Search ................................. 62/228.4, 157, 62/231, 227, 228.5

[56] References Cited

U.S. PATENT DOCUMENTS

| | | | |
|---|---|---|---|
| 4,662,185 | 5/1987 | Kobayashi et al. | 62/228.4 |
| 4,765,150 | 8/1988 | Persem | 62/215 |
| 4,819,441 | 4/1989 | Hanson | 62/160 |
| 4,858,443 | 8/1989 | Denpou | 62/126 |
| 4,891,952 | 1/1990 | Yoshikawa et al. | 62/199 |
| 4,893,479 | 1/1990 | Gillett et al. | 62/213 |
| 4,989,414 | 2/1991 | Murayama et al. | 62/228.4 |
| 5,033,272 | 7/1991 | Yoshikawa et al. | 62/199 |
| 5,123,080 | 6/1992 | Gillet et al. | 388/934 |
| 5,257,508 | 11/1993 | Powell et al. | 62/180 |
| 5,263,335 | 11/1993 | Isono et al. | 62/228.4 |
| 5,524,447 | 6/1996 | Shim | 62/209 |
| 5,669,226 | 9/1997 | Kurahashi et al. | 62/227 |
| 5,787,718 | 8/1998 | Jeong | 62/157 |
| 5,867,996 | 2/1999 | Takano et al. | 62/175 |

*Primary Examiner*—William Doerrler
*Assistant Examiner*—Marc Norman
*Attorney, Agent, or Firm*—Robert E. Bushnell, Esq.

[57] ABSTRACT

Disclosed is a refrigerator comprising: a compressor having a driving motor with controllable rotation speed, an exterior sensor for sensing an exterior temperature, an evaporator sensor for sensing an evaporator temperature, a selection part for selecting an operation mode, and a control part for controlling operations of a driving motor. Where a quick-cooling mode is selected by the user through the selection part, the control part controls the driving motor, considering exterior conditions influencing the efficiency of cooling. The control part increases the rotation speed of the driving motor as the exterior temperature detected by the exterior sensor is higher. The control part increases the rotation speed of the driving motor as the evaporator temperature detected by the evaporator sensor is higher. Thus, the compression capacity of the compressor is adjusted according to the exterior temperatures and the evaporator temperatures, so the efficiency of cooling is improved and the over-load of the compressor is prevented.

20 Claims, 5 Drawing Sheets

REFRIGERATOR HAVING A COMPRESSOR WITH VARIABLE COMPRESSION CAPACITY

BACKGROUND OF THE INVENTION

1. Field of the Invention

The present invention relates to a refrigerator, and more particularly, to a refrigerator having a compressor driving motor whose driving speed is controlled, considering such conditions affecting a cooling operation of the refrigerator as an exterior temperature and an evaporator temperature, where a quick-cooling mode is selected by a user.

2. Prior Art

FIG. 1 is a side sectional view of a refrigerator. The refrigerator is comprised of a pair of cooling compartments partitioned by a partition wall 6, that is, a freezing compartment 3 and a fresh food compartment 2. Interior temperature sensors 12a and 12b are respectively installed in the freezing compartment 3 and the fresh food compartment 2 for sensing the temperatures within them. On the fronts of the freezing compartment 3 and the fresh food compartment 2 are installed their respective doors 5 and 4.

In the rear lower part of the refrigerator is installed a compressor for compressing refrigerant, and in the rear sides of the cooling compartments 2 and 3 are installed respective evaporators 22a and 22b. The refrigerant compressed by the compressor 21 is condensed by a condenser (not shown), and the condensed refrigerant is supplied to the evaporators 22a and 22b. The evaporators 22a and 22b evaporates the refrigerant, thereby generating cool air. The cool air generated in the evaporators 22a and 22b is blown into the freezing compartment 3 and the fresh food compartment 2 by their respective fans 23a and 23b. In this process, foods in the freezing compartment 3 and the fresh food compartment 2 are cooled.

A user can control interior temperatures in the cooling compartments 2 and 3 as desired, by selecting an operation mode of the refrigerator through a control panel (not shown). The control part (not shown) drives the compressor 21 according to the operation mode selected by the user. In otherwords, the control part 21 continuously drives the compressor 21 until the interior temperatures in the cooling compartments 2 and 3 attain those set by the user. When the interior temperature sensors 12a and 12b detect that the interior temperatures in the cooling compartments 2 and 3 are lower or than the set temperature, the control part stops operation of the compressor 21 to interrupt a cooling operation.

The refrigerator provides a quick-cooling mode to attain the temperature set by the use quickly. When the user selects the quick-cooling mode to cool quickly the freezing compartment 3 and/or the fresh food compartment 2, the control part 21 drives the compressor 21 to generate cool air, and blows the generated cool air into the freezing compartment 3 and/or the fresh food compartment 2 by driving the freezing compartment fan 23a and/or the fresh food compartment fan 23b.

However, where the user selects the quick-cooling mode, since the conventional refrigerator drives the compressor 21, without considering such conditions affecting the efficiency of cooling as an exterior temperature or evaporator temperatures, quick-cooling has not been efficient. Since the conventional refrigerator drives the compressor 21 under the constant conditions, irrespective of the exterior temperature or the evaporator temperatures, the compressor 21 is driven with more excessive output power than requested; the compressor 21 is liable to be over-loaded.

Where the compressor 21 is driven with proper output power in order to prevent the over-load, the interior temperatures of the cooling compartments 2 and 3 are unlikely to attain the set temperatures quickly.

SUMMARY OF THE INVENTION

To overcome the above-described problems, it is the object of the invention to provide a refrigerator, which the efficiency of cooling is improved and the over-load of the compressor is prevented, by adjusting the driving power of the compressor according to the conditions affecting the cooling efficiency.

BRIEF DESCRIPTION OF THE DRAWINGS

The present invention will be better understood and its various objects and advantages will be more fully appreciated from the following description taken in conjunction with the accompanying drawings, in which.

DETAILED DESCRIPTION OF THE INVENTION

To accomplish the object of the present invention, the refrigerator is comprised of: a compressor having a driving motor with controllable driving speed, the compressor for compressing refrigerant; an evaporator for generating cool air to be supplied to the cooling compartments by evaporating the refrigerant compressed by said compressor; an exterior sensor for detecting an exterior temperature; an evaporator sensor for detecting a temperature of said evaporator; a selection part for selecting a quick-cooling mode; and a control part for controlling said driving motor.

Where a user selects said quick-cooling mode through said selection part, said control part controls to rotate said driving motor at quicker speed as the exterior temperature detected by said exterior sensor or the evaporator temperature detected by said evaporator sensor is higher than a predetermined speed.

Preferably, said control part divides said exterior temperature or said evaporator temperatures into a plurality of levels and controls a rotation speed of said compressor, corresponding to each level of said exterior temperature or said evaporator temperatures. Said control part drives said driving motor for a shorter time as the rotation speed of said driving motor is higher. For this purpose, the driving time of said driving motor is preferably estimated from the instant that the interior temperatures of said cooling compartments attain the temperature set by the user.

According to the present invention, the efficiency of cooling is improved and over-load of said compressor is prevented by changing the rotation speed and the driving time of said driving motor in consideration of an exterior temperature and an evaporator temperature which influence the efficiency of cooling under a quick-cooling mode.

Figure 1:
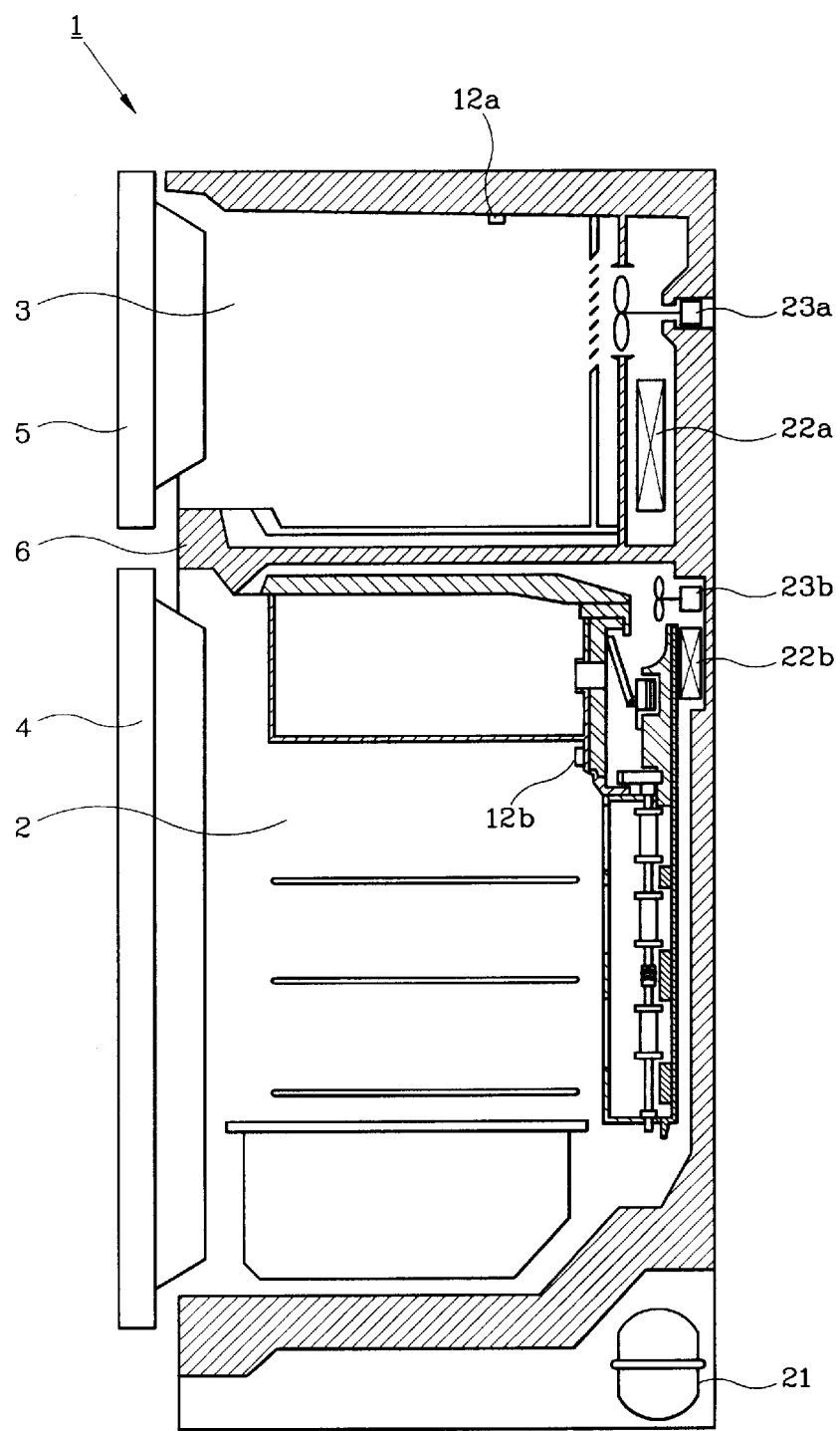
FIG. 1 is a side sectional view of a typical refrigerator.

Hereinafter, the present invention will be described in detail with reference to the accompanying drawings. Preferred embodiments of the present invention will be described with reference to FIG. 1. Each reference numeral used in referring to each part of a refrigerator shown in FIG. 1 will be described briefly and the same parts will be referred to by the same reference numerals.

Figure 2:
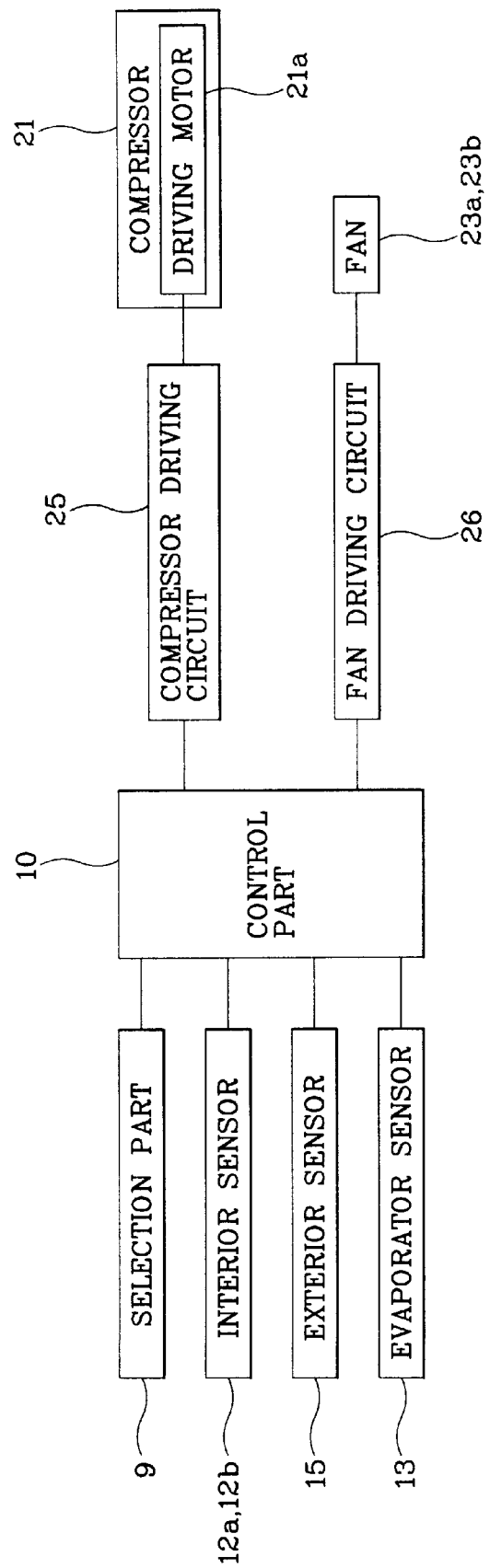
FIG. 2 is a block diagram of a control device of a refrigerator according to the present invention.

FIG. 2 is a block diagram of a control device of a refrigerator according to the present invention. The refrigerator, as described with reference to FIG. 1, has a pair of cooling compartments 2 and 3, interior temperature sensors 12a and 12b within the cooling compartments 2 and 3, a compressor 21 for compressing refrigerant, evaporators 22a and 22b for generating cool air by evaporating the refrigerant compressed in the compressor 21, fans 23a and 23b for blowing the cool air generated in the evaporators 22a and 22b into the cooling compartments 2 and 3, and a control part 10 for controlling operations of the compressor 21, and fans 23a and 23b. The refrigerator further has a selection part 9 for selecting one of several cooling operation modes such as low temperature mode, high temperature mode or quick-cooling mode, etc., a compressor driving circuit 25 for controlling an operation of the compressor 21 and a fan driving circuit 26 for controlling operations of the fans 23a and 23b.

According to the present invention, the refrigerator has an exterior sensor 15 and an evaporator sensor 13. The exterior sensor 15 is installed on the outer surface of the cabinet 1 of the refrigerator. It is preferable to install the exterior sensor on the frontal side of said body 1. The exterior sensor 15 measures the exterior temperature, that is, the temperature in the room where the refrigerator is installed. The evaporator sensor 13 is installed on, or adjacent to, the evaporators 22a and 22b to measure the evaporator temperatures. The measured evaporator temperatures are inputted to the control part 10.

A driving motor 21a is installed inside of the compressor 21. The driving motor 21a is an only device requiring a power supply among devices in the compressor 21, so a compressor driving circuit 25 actually drives the driving motor 21a. The control part 10 controls refrigerant compression of the compressor 21 by controlling operations of the driving motor 21a through the compressor driving circuit 25. A brushless motor or an invertor motor is used for the driving motor 21a for changing rotation speed of the driving motor 21a. Thus, the control part 10 is capable of controlling the capacity of the refrigerant compressed by the compressor 21 by adjusting the rotation speed of the driving motor 21a.

Where a user selects a quick-cooling mode through a selection part 9, the control part 10 controls the driving motor 21a, considering exterior conditions influencing the efficiency of cooling. The control part 10 increases the rotation speed of the driving motor 21a as the exterior temperature detected by the exterior sensor 15 is higher than a predetermined temperature. The control part 10 also increases the rotation speed of the driving motor 21a as the evaporator temperature detected by the evaporator temperature is higher. Thus, the higher the exterior temperature or the evaporator temperatures are, the more the capacity of the refrigerant compressed by the compressor is and the higher the efficiency of cooling operation is.

Figure 3:
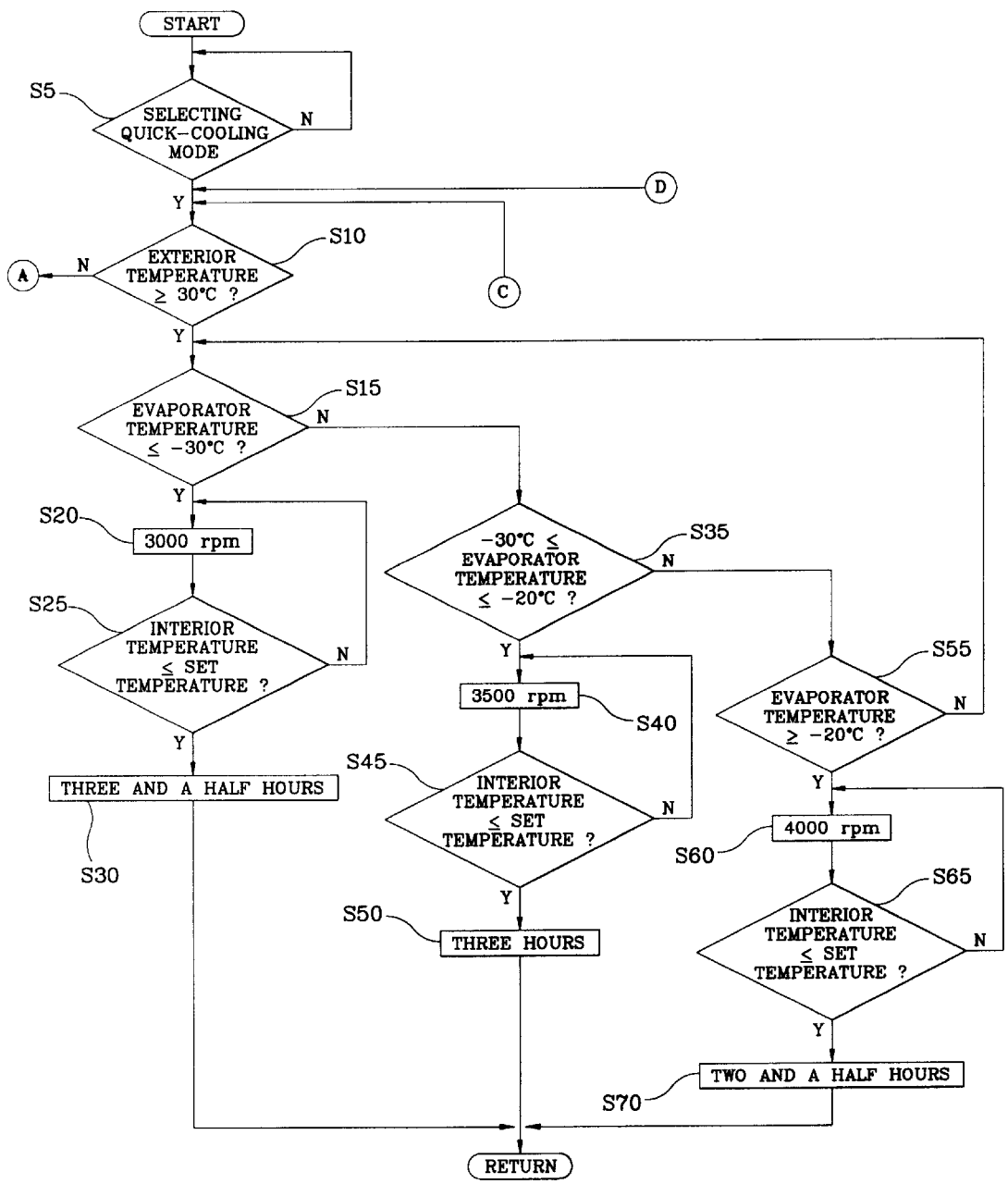
FIGS. 3 through 5 are flow charts showing control processes of a refrigerator controlled by the control device shown in FIG. 2.
Figure 4:
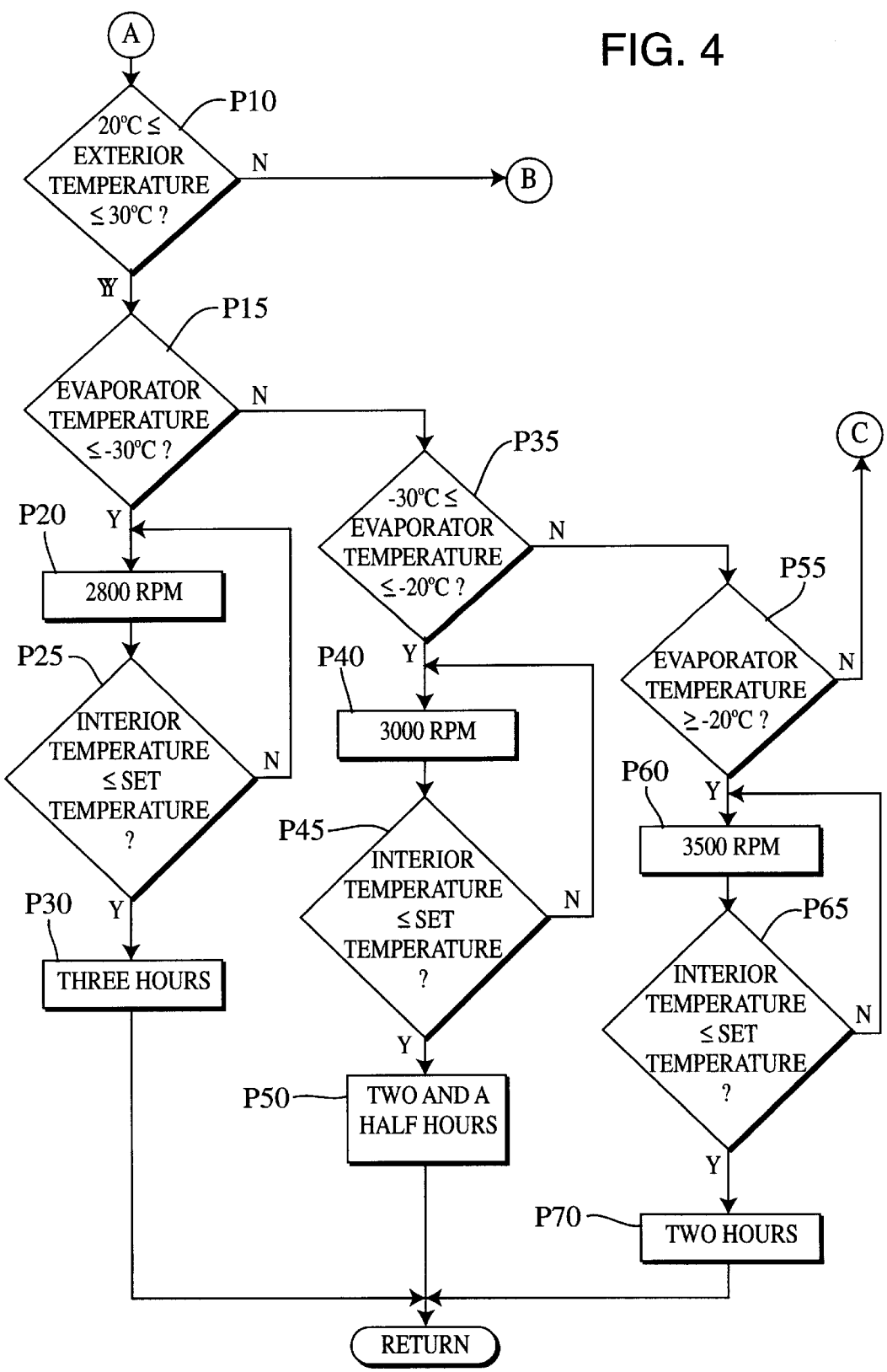
Figure 5:
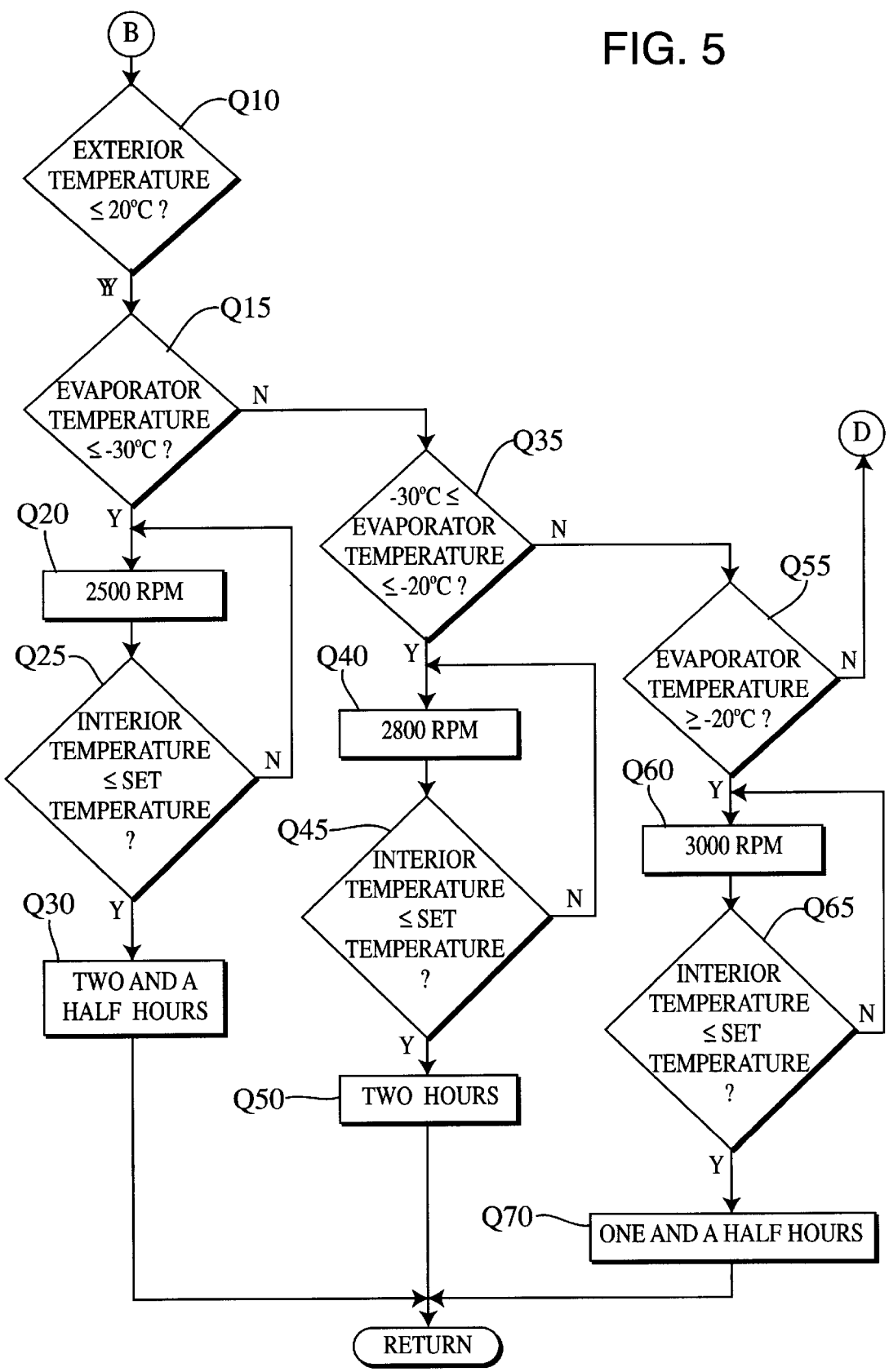

Hereinbelow the cooling operation will be described in more detail with reference to FIGS. 3 through 5. FIGS. 3 through 5 are flow charts showing processes of controlling the refrigerator by the control device shown in FIG. 2.

When a power supply is applied to the refrigerator and the user selects an operation mode through the control part 9, the control part drives the compressor 21 according to the operation mode selected by the user. When a quick-cooling mode is selected by the user while the refrigerator is under the cooling operation (S5), the control part is inputted information about the exterior temperature and the evaporator temperatures respectively from the exterior sensor 15 and the evaporator sensors 22a and 22b.

As shown in FIG. 3, where the exterior temperature is higher than a predetermined temperature, for example, is over 30° C. (S10), and the evaporator temperatures are lower or than the predetermined temperature, for example, is belo −30° C. (S15), the control part 10 drives the driving motor 21a of the compressor 21 at a predetermined speed, for example, 3000 rpm (S20). On the basis of the interior temperatures of the cooling compartments 2 and 3 detected by the interior temperature sensors 12a and 12b, the control part 10 determines whether the interior temperatures of the cooling compartments 2 and 3 arrive at those set by the user (S25). When the interior temperatures of the cooling compartments 2 and 3 reach the set temperatures, the control part 10 is driving the driving motor 21a for a predetermined time from the arrival time of the set temperatures, for example, for three and half hours (S30).

Where the evaporator temperatures 22a and 22b are between −20° C. and −30° C. (S35), the control part 10 drives the driving motor 21a at the speed of 3,500 rpm (S40) and determines, on the basis of the interior temperatures detected by the interior temperature sensors 12a and 12b, whether the interior temperatures of the cooling compartments 2 and 3 reach at those set by the user (S45). When the interior temperatures of the cooling compartments 2 and 3 reach the set temperatures, the control part 10 drives the driving motor 21a for three hours from the moment when the set temperature is attained (S50). When the evaporator temperatures are higher or than −20° C. (S55), the control part 10 drives the driving motor 21a at the speed of 4,000 rpm until the interior temperatures of the cooling compartments 2 and 3 reach the set temperatures (S60). When the interior temperatures of the cooling compartments reach the set temperatures (S65), the control part drives the driving motor 21a for two and half hours from the moment (S70).

As shown in FIG. 4, where the exterior temperature sensed by the exterior sensor 15 is between 20° C. and 30° C. (P10) and the evaporator temperatures are below −30° C. (P15), the control part 10 drives the driving motor 21a at the speed of 2,800 rpm (P20). When the interior temperatures of the cooling compartments 2 and 3 reach the set temperatures (P25), the control part 10 drives the driving motor 21a for three hours (30).

Likewise, where the evaporator temperatures are between −20° C. and −30° C. (P35), the control part 10 drives the driving motor 21a at the speed of 3,000 rpm (S40). When the interior temperatures of the cooling compartments 2 and 3 reach the set temperatures (P45), the control part 10 drives the driving motor 21a for two and half hours from the instant (P50). When the evaporator temperatures are higher or than −20° C. (P55), the control part 10 drives the driving motor 21a at the speed of 3,500 rpm (P60). When the interior temperatures of the cooling compartments 2 and 3 reach the set temperatures (P65), the control part 10 drives the driving motor 21a for two hours (P70).

As shown in FIG. 5, where the exterior temperature is below 20° C. (Q10) and the evaporator temperatures are below −30° C. (Q15), the control part 10 drives the driving motor 21a at the speed of 2,500 rpm (Q20). When the interior temperatures of the cooling compartments 2 and 3 reach the set temperatures (Q25), the control part 10 drives the driving motor 21a for two and half hours from the instant (Q30). Likewise, where the evaporator temperatures are between −20° C. and −30° C.(Q35), the control part 10 drives the driving motor 21*a* at the speed of 2,800 rpm (Q40). When the interior temperatures of the cooling compartments 2 and 3 reach the set temperatures (Q45), the control part 10 drives the driving motor 21*a* for two hours from the instant (Q50). When the evaporator temperatures are higher or than −20° C. (Q55), the control part 10 drives the driving motor 21*a* at the speed of 3,000 rpm (Q60.). When the interior temperatures of the cooling compartments 2 and 3 reach the set temperatures (Q65), the control part 10 drives the driving motor 21*a* for one and half hours (Q70).

As described above, where the refrigerator is under the quick-cooling mode, the higher the exterior temperature and the evaporator temperatures are, the higher the rotation speed of the driving motor 21*a* is; and the higher the rotation speed of the driving motor 21*a* is, the shorter the driving time is. Thus, under the quick-cooling mode, since the operation of the compressor 21 can be adjusted according to the exterior temperature and the evaporator temperatures, over-load of the compressor 21 is prevented and the quick-cooling can be performed at an optimum condition.

In the above-mentioned embodiments, the exterior temperatures and the evaporator temperatures are divided into a plurality of levels and accordingly the rotation speed and the driving time of the driving motor 21*a* are set in stages to correspond to the levels, but the rotation speed and the driving time of the driving motor 21*a* can be set to linearly correspond to the exterior temperatures and the evaporator temperatures.

In the above-mentioned embodiments, examples of a control device considering both the exterior temperature and the evaporator temperatures influencing the efficiency of cooling operation have been described. However, the compressor 21 can be controlled based only on the exterior temperature, or on the evaporator temperatures.

In the above-described embodiments, samples showing where the quick-cooling modes are selected both on the freezing compartment 3 and the fresh food compartment 2, have been described. However, the control process according to the present invention can only apply to either the freezing compartment 3 or the fresh food compartment 2. Or, either of the freezing compartment 3 or the fresh food compartment 2 can be selectively cooled according to the user's selection.

As described above, according to the present invention, the efficiency of cooling is improved and the over-load of the compressor is prevented by adjusting the rotation speed and the driving time of the driving motor inside the compressor, considering the exterior temperature and the evaporator temperatures influencing the efficiency of cooling in the course of cooling operation.

What is claimed is:

1. A refrigerator, comprising:
    a compressor having a driving motor with controllable rotation speed, the compressor for compressing refrigerant;
    an evaporator for generating cool air to be supplied into cooling compartments within said refrigerator by evaporating the refrigerant compressed by said compressor;
    an exterior sensor for detecting an exterior temperature;
    a selection part for selecting a quick-cooling mode; and
    a control part for increasing the rotation speed of said driving motor where the exterior temperature sensed by said exterior sensor is higher than a predetermined temperature under the quick-cooling mode selected through the selection part.

2. A refrigerator according to claim 1, wherein said control part divides said exterior temperature into a plurality of levels and controls the rotation speed of said compressor by stages, corresponding to each level of said exterior temperature.

3. A refrigerator according to claim 2, further comprising:
    evaporator sensors for sensing the temperatures of said evaporators; and
    wherein said control part increases the rotation time of said driving motor as the evaporator temperatures sensed by said evaporator sensors are higher.

4. A refrigerator according to claim 3, wherein said control part divides said evaporator temperatures into a plurality of levels and controls the rotation speed of said compressors by stages, corresponding to each level of said evaporator temperatures.

5. A refrigerator according to claim 1, wherein said control part reduces the driving time of said driving motor as the rotation speed of said driving motor is higher.

6. A refrigerator according to claim 5, wherein the driving time of said driving motor is measured from the instant when the interior temperatures of said cooling compartments reach those set by the user.

7. A refrigerator, comprising:
    a compressor having a driving motor with controllable rotation speed compressing refrigerant;
    an evaporator exhibiting a range of temperatures while generating cooling air to be supplied into cooling compartments within said refrigerator by evaporating the refrigerant compressed by the compressor;
    a sensor indicating temperatures of said evaporator;
    a selector enabling selective designation of one of a plurality of quick-cooling modes; and
    a controller increasing the rotation speed of said driving motor when an exterior temperature sensed by said sensor is higher than a predetermined temperature during a quick-cooling mode designed by said selector.

8. A refrigerator according to claim 7, further comprising said controller dividing said range of temperatures into a plurality of levels and controlling said rotation speed of said compressor by stages corresponding to each level of said evaporator temperatures.

9. A refrigerator according to claim 7, wherein said control part reduces the driving time of said driving motor as the rotation speed of driving motor is higher.

10. A refrigerator according to claim 9, wherein the driving time of said driving motor is measured from the instant when the interior temperatures of said cooling compartments reach those set by the user.

11. A refrigerator, comprising:
    a compressor having a driving motor with controllable rotation speed, compressing refrigerant;
    an evaporator exhibiting a range of temperatures while generating cool air to be supplied into cooling compartments within said refrigerator by evaporating the refrigerant supplied from said compressor;
    a sensor indicating an exterior temperature; and
    a controller increasing the rotation speed of said driving motor when the exterior temperature sensed by said sensor is higher than a predetermined temperature.

12. The refrigerator of claim 11, further comprised of:
    a mode selector enabling selective designation of one of a plurality of a quick-cooling modes; and said controller controlling the rotation speed of said driving motor during a quick-cooling mode designated by said selector.

13. The refrigerator of claim 11, further comprising said controller dividing said range of exterior temperatures into a plurality of levels and controlling the rotation speed of said compressor by stage, corresponding to each level of said exterior temperature.

14. The refrigerator according to claim 11, further comprising a said controller reducing a driving time of said driving motor when the rotation speed of said driving motor is higher.

15. The refrigerator according to claim 11, further comprising a driving time of said driving motor measured from the instant when an interior temperature of the cooling compartments reach a reference set by a user.

16. A refrigerator, comprising:
   a compressor having a driving motor with controllable rotation speed compressing refrigerant;
   an evaporator exhibiting a range of temperatures while generating cooling air to be supplied into cooling compartments within said refrigerator by evaporating the refrigerant supplied from the compressor;
   a sensor indicating temperatures of said evaporator; and
   a controller increasing the rotation speed of said driving motor where an exterior temperature sensed by said sensor is higher than a predetermined temperature.

17. The refrigerator of claim 16, further comprised of a mode selector enabling selective designation of one of a plurality of predetermined temperatures.

18. The refrigerator of claim 16, further comprising said controller dividing said range of temperatures into a plurality of levels and controlling the rotation speed of said compressor by stage, corresponding to each level of said evaporator temperatures.

19. The refrigerator of claim 16, further comprising said controller reducing a driving time of said driving motor as the rotation speed of driving motor is higher than a predetermined rotation speed.

20. The refrigerator of claim 16, wherein a driving time of said driving motor is measured from the instant when an interior temperature of said cooling compartments reach a reference set by a user.

* * * * *